United States Patent

[11] 3,563,380

| [72] | Inventor | Frank B. Thomas |
| | | 713 Evergreen Drive, Akron, Ohio 44303 |
| [21] | Appl. No. | 882,168 |
| [22] | Filed | Dec. 4, 1969 |
| [45] | Patented | Feb. 16, 1971 |

[54] METHOD OF REMOVING FLOATING CONTAMINANTS FROM STREAMS
2 Claims, 4 Drawing Figs.

[52] U.S. Cl. .................................................. 210/83, 210/170, 210/242
[51] Int. Cl. .................................................. B01d 21/00
[50] Field of Search .......................................... 210/83, 170, 242, (Oil-Water Digest)

[56] References Cited
UNITED STATES PATENTS

| 42,073 | 3/1864 | Cannon | 210/242 |
| 61,880 | 2/1867 | Serrell | 210/242 |
| 1,397,892 | 11/1921 | Jones | 210/242X |

*Primary Examiner*—Samih N. Zaharna
*Attorney*—Oldham and Oldham

ABSTRACT: A method of removing oil, grease and other floating contaminants from a stream and it includes floating a barricade, which extends above the surface of the water, in a stream, and positioning this barricade at an acute angle to the direction of flow of the stream. The contaminants collect on the upstream face of the barricade and periodically are removed from the surface of the stream, and adjustable barricade means are present in the apparatus.

Patented Feb. 16, 1971
3,563,380
FIG. 1
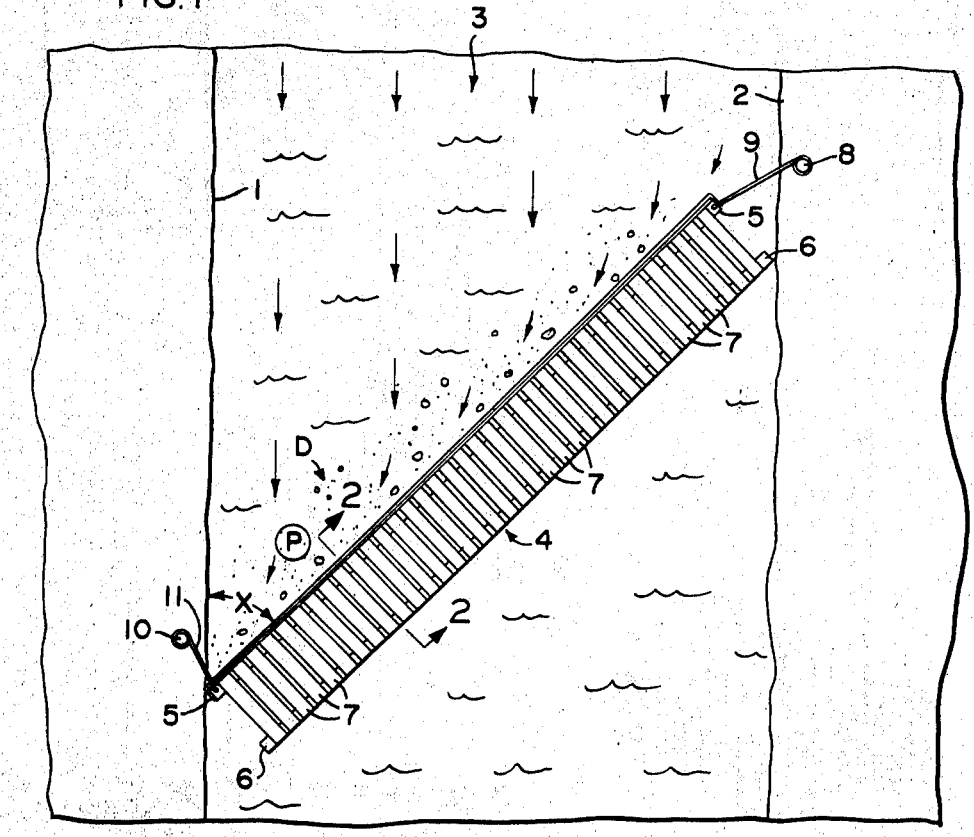
FIG. 2
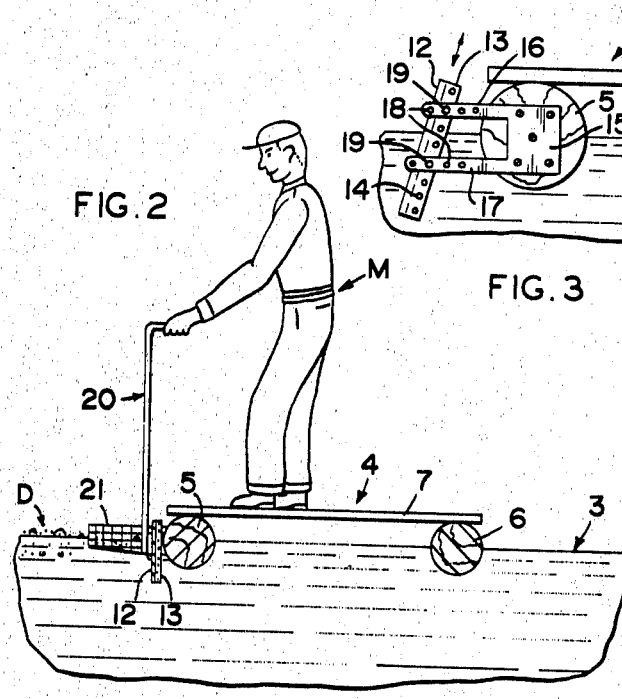
FIG. 3
FIG. 4
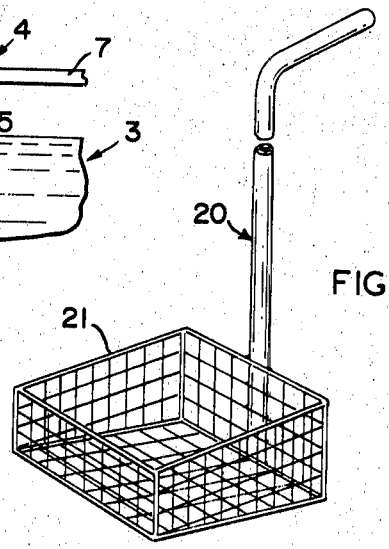
INVENTOR.
FRANK B. THOMAS
BY
Oldham & Oldham
ATTORNEYS.

METHOD OF REMOVING FLOATING CONTAMINANTS FROM STREAMS

The present invention relates to the purification of water, especially in relatively small flowing streams of water which have floating contaminants such as oil, grease or other foreign materials thereon, and to methods of and apparatus for such removal.

It always has been, and still is, a difficult job to remove contaminants from streams and great effort is being expended in that direction today. Adjacent many industrial plants, small streams are used for supplies of water for various industrial purposes and such water, when discharged back into the stream, may have quantities of oil, grease or other contaminants therein or formed in the stream as flowing away from the plant. In other words, a great percentage of the contaminates found in industrial waste products today may either be of the type that will settle to the bottom of the stream, or else will float on the top of the surface of the water. The presence of oil and grease is particularly obnoxious in flowing streams inasmuch as it spreads out over the surface of the stream and contaminates large areas thereof.

The general object of the present invention is to provide a novel and improved method of removing floating contaminants from flowing streams and it comprises the feature of providing a floating member positioned at an acute angle to the direction of current flow of the stream for physically stopping the contaminants moving with the stream and collecting them in a localized area.

Another object of the invention is to facilitate the removal of contaminants in a stream by collecting them in a section of the stream whereby the contaminants can be skimmed from the stream periodically or be otherwise removed after being collected at a localized portion of the stream.

A further object of the invention is to provide an improved, inexpensive, effective method of removing floating contaminants including oil and grease from streams and wherein a person can manually skim collected contaminants from the stream at intermittent times.

Yet a further object of the invention is to provide an improved adjustable apparatus to aid in collecting floating contaminants in a stream.

The foregoing and other objects and advantages of the invention will be made more apparent as the specification proceeds.

Reference now is made to the accompanying drawings wherein:

FIG. 1 is a fragmentary diagrammatic plan of a stream having the apparatus of the invention associated therewith for practice of the contaminant removal method of the invention;

FIG. 2 is a cross-sectional view through the apparatus of FIG. 1, taken on 2–2 thereof, and indicating how the contaminants can be manually removed;

FIG. 3 is an end elevation of a portion of the barricade; and

FIG. 4 is a perspective view of the manual contaminant removal means of the invention.

When referring to corresponding members shown in the drawings and referred to in the specification, corresponding numerals are used to facilitate comparison therebetween.

INVENTIVE SUBJECT MATTER

In general, the present invention relates to the provision of a floating barricade which can be positioned at an angle to a flowing stream to extend completely thereacross, but to float on the surface of the stream and extend thereabove. The invention contemplates collecting contaminants flowing with the stream against the barricade and directing the contaminants to a localized area of the barricade, after which the floating contaminants can be manually or otherwise skimmed from the surface of the stream. An improved adjustable stop plate is carried by the barricade.

Reference now is made to FIG. 1 of the drawings, wherein the adjacent banks 1 and 2 of a stream 3 are indicated. Usually this stream 3 is a relatively narrow stream, and it may have an appreciable quantity of floating contaminants therein, including oil, grease, living matter, and other objects which contaminate the water in the stream 3 and render it unsafe for bathing or for other use.

As an important feature of the invention, the invention provides a floating barricade indicated by the numeral 4. I prefer to make this floating barricade from relatively lightweight sturdy wood members, such as a pair of utility or telegraph poles 5 and 6, that have a number of cross treads or decking 7 secured thereto to form a unit from the barricade, which unit will float an appreciable amount above the surface of the water in the stream 3. The barricade is of such length that it can be positioned at an acute angle X to the direction of current flow of the stream 3, as indicated in the drawings. The barricade should be at an angle X of 45° or less with the axis of flow and an angle of 30° has proven very effective. The barricade is attached to a suitable post, or equivalent member 8, on the bank 2 of the stream 3 by any suitable cable 9, or the like, that is conventionally attached to the upstream end of the barricade 4. Likewise, a post 10 is provided adjacent the downstream end of the barricade and it is attached to the barricade by a cable or equivalent member 11 whereby variations in the level of the stream will be automatically compensated for as the barricade is in use.

In all events, as floating oil, grease, scum, and other objects flow down with the current of the stream 3, the floating matter can be collected against the upstream edge or face of the pole 5 and it will tend to accumulate the debris in the manner indicated by the arrows provided in FIG. 1. Several of the poles 5 can be chained or otherwise secured together to extend across a wider stream.

The upstream pole 5 may have a suitable vertically extending member such as a metal sheet or a 2×10 wood beam or the like secured thereto to form a contaminant stopping face or surface for the barricade, if desired. FIG. 3 of the drawings best shows that a stop or collecting means comprising a metal plate 12 is provided. This plate 12 preferably is of greater vertical height than the pole 5 and it has end flanges 13 with a plurality of vertically spaced holes 14 therein. A support plate 15 with two support arms 16 and 17 is secured to each end of the pole 5 with the support arms 16 and 17 extending in an upstream direction. A plurality of horizontally spaced holes 18 are provided in each of the support arms. The flanged plate 12 is adapted to be secured to and extend between the support plates 15 and be positionable at any suitable depth in the water and/or at any desired angle to the vertical. Bolts, pins or equivalents 19 secure the plate 12 to the support arms 16 and 17.

If several of the floating barricade units are required to extend across a stream, removable short connector plates, for example, could be present and have support hooks at their upper ends. Hence, such connector plates could be secured to and supported by end portions of adjacent plates 12.

The invention then contemplates that after a quantity of the contaminants has been collected on the upstream end of the barricade 4, intermittently such contaminants will be skimmed from the surface of the stream 3. Thus, I have shown that a man M may walk along the barricade using a suitable scoop 20 to manually skim the contaminants from the stream by means of a wire mesh basket 21 secured to the lower end of the handle of the scoop 20. Such scoop 20 then would be intermittently cleaned by dumping its contents into a suitable waste collector for disposal. Depending upon the current flow rate for the stream 3 and the amount of contaminants moving with the stream, these materials would be intermittently skimmed or be removed from the surface of the water otherwise as by pumping off the contaminants by a floating pump or other means once or twice a day, or once or twice a week, depending upon the current flow and the amount of foreign objects collected.

In use of the method and apparatus of the invention, it has been found that oil and grease are particularly effectively removed from the stream by the novel method as such scum, oil and grease tends to accumulate or be rolled back along the face of the telegraph pole 5, or equivalent stop member provided, so that the water on the downstream side of the barricade 4 has no oil and grease scum appearing thereon. The debris collects primarily at the downstream end of the barricade.

A floating pump of conventional construction as indicated at P may be provided and be driven by a gasoline or electric motor to remove the contaminants and/or oil scum collected.

The method of and apparatus of the invention are efficient and are low in cost whereby it is contended that the objects of the invention have been achieved.

While one complete embodiment of the invention has been disclosed herein, it will be appreciated that modification of this particular embodiment of the invention may be resorted to without departing from the scope of the invention.

I claim:

1. A method of removing oil, grease and other floating contaminants from a flowing stream comprising the steps of:

placing a floating barricade in the stream, which barricade extends above the surface of the water and includes a pair of spaced parallel elongate members with cross treads extending therebetween;

positioning the barricade at an acute angle with the direction of flow of the stream so that the contaminants are stopped by the barricade and tend to accumulate at the downstream end thereof; and removing the collected contaminants by manually skimming the contaminants off of the stream while walking along the barricade.

2. A method as in claim 1 and including the steps of:

securing said barricade in position to enable it to rise and fall with variations in the level of the water; and collecting the contaminants along an adjustably positioned member on the upstream margin of said barricade.